United States Patent [19]

Rountree

[11] 4,283,767
[45] Aug. 11, 1981

[54] MULTIPLE CORRELATOR REFERENCE PROCESSOR

[75] Inventor: Hoyt S. Rountree, Portsmouth, R.I.

[73] Assignee: Raytheon Company, Lexington, Mass.

[21] Appl. No.: 35,750

[22] Filed: May 3, 1979

[51] Int. Cl.³ .................. G06F 15/20; G06G 7/19; G01S 3/86
[52] U.S. Cl. .................. 364/574; 364/517; 364/728; 364/819; 367/125; 367/901
[58] Field of Search .............. 364/119, 820, 728, 517, 364/574; 343/5 PD, 5 SA; 367/120, 124, 125, 901; 340/554, 565

[56] References Cited

U.S. PATENT DOCUMENTS

| | | | |
|---|---|---|---|
| 3,337,870 | 8/1967 | Allen et al. | 364/819 X |
| 3,716,825 | 2/1973 | Walsh et al. | 367/125 X |
| 3,875,394 | 4/1975 | Shapely | 364/819 X |
| 3,905,009 | 9/1975 | Hughes et al. | 367/124X |
| 3,943,514 | 3/1976 | Afendykiw et al. | 343/113 R X |
| 3,979,712 | 9/1976 | Ettenhofer et al. | 367/125 |
| 4,017,859 | 4/1977 | Medwin | 367/125 X |
| 4,034,376 | 7/1977 | Barton | 343/113 R X |
| 4,041,494 | 8/1977 | Ewen et al. | 343/113 R X |
| 4,090,147 | 5/1978 | Seidel | 330/10 |

*Primary Examiner*—Felix D. Gruber

*Attorney, Agent, or Firm*—Martin M. Santa; Joseph D. Pannone

[57] ABSTRACT

A signal processor for use with an array of antenna elements comprises a plurality of pairs of receiver channels which receive signals from respective halves of the array. The component of the signals resulting from noise, such as the noise generated within the ocean, is substantially decorrelated between the respective halves of the array, while a component of the signal obtained from a source of a desired signal is coherent between the two halves of the array. The signals in each pair of channels are translated to intermediate frequencies by mixing the signals with reference signals of differing frequencies in each of the respective pairs of channels. The translated signals in each pair of channels are then multiplied together to produce a signal of substantially constant amplitude which is suitable for detection, or for a bearing deviation indication. Output signals of the respective multipliers are summed together and passed through a low pass filter having a pass band approximately equal to the reciprocal of the anticipated dwell time of the signal source within the beam width of the array of antenna elements. The uncorrelated noise results in an alternating component in the products of the respective multipliers which are substantially cancelled in the summing and filtering to produce a higher signal-to-noise ratio.

7 Claims, 8 Drawing Figures

MULTIPLE CORRELATOR REFERENCE PROCESSOR

BACKGROUND OF THE INVENTION

Arrays of antenna elements are often employed in both radar systems and sonar systems, the antenna elements of the sonar system taking the form of sonar transducers. The arrays my be utilized for the detection of a source of radiation, electromagnetic radiation in the case of radar and sonic radiation in the case of sonar, as well as for the indication of a direction of the source relative to the array. In both the cases of electromagnetic radiation and sonic radiation, the array receives radiation from sources of noise in addition to the signal emanating from a point distant from the array. The signal from the distant point is to be detected and the direction thereof is to be measured.

A situation of interest is that of a sonar array in the form of a line array wherein the broadside direction of the array is oriented in the general direction of a source of sound. As is well known, signals received by transducers in the right half of the array and signals received by transducers in the left half of the array may be processed by a bearing deviation indicator circuit to provide the bearing angle of a source of the sound relative to the array axis. Or, alternatively, the signals from the two halves of the array may be combined for detection of the presence of the sound source. In both cases, a problem exists in that noise, such as that customarily found within the ocean produces a lower limit on the magnitude of the received sound which can be detected and which can be measured to determine the direction. Attempts have been made to increase the signal power relative to the noise power by enlarging the sonar array. However, the resulting arrays are often too large to be employed on a ship which is to carry the sonar array.

SUMMARY OF THE INVENTION

The aforementioned problem is overcome and other advantages are provided by a signal processing system which improves the signal-to-noise power ratio for signals received from an array of antenna elements. The signal processing system comprises a set of parallel signal receiving channels, each of which processes signals received by the array of antenna elements. To facilitate the explanation of the invention, the invention will be described with reference to a sonar system, it being understood that the invention applies equally well to a radar system.

Each of the receiving channels comprises a pair of subchannels wherein one subchannel receives the sum of signls from one half of the array while the other subchannel receives the sum of signals from the other half of the array. Assuming, by way of example, that a line array of sonar transducers is being utilized in conjunction with a bearing deviation indicator, one subchannel receives the sum signal from the transducers in the right half of the array while the other subchannel receives the sum signal from the transducers in the left half of the array.

In accordance with the invention, the signals in each pair of subchannels are translated to an intermediate frequency by a mixing of the respective signals with a reference signal having a predetermined frequency. The predetermined frequency utilized in one receiver channel differs from that utilized in a second and in subsequent ones of the receiver channels by a frequency difference which is greater than the reciprocal of the dwell time of a source of sonic signals within the receiving beam of the array. The signals at the intermediate frequencies in each of the subchannels are then compared, either by synchronous detection, multiplication, or an exclusive OR circuit, to produce a resultant signal which is representative of the difference in delay, or phase shift, between the sum signals of the right and left halves of the array. The resultant signal is an indication of the bearing of a sound source relative to the axis of the array. Alternatively, the two subchannel signals may be combined to produce a resultant signal which represents the sum of the two subchannel signals, this resultant signal being an indication of the presence of the sonar signal.

The signals resulting from the aforementioned comparison in each of the respective channels are then summed together in a summing circuit and passed through a low pass filter at the output terminal of the summing circuit. The output low-pass filter has a pass band equal to that of the data which is to be extracted from the sonar signal. For example, in the case of a bearing deviation indication, the pass band would be approximately equal to the reciprocal of the anticipated dwell time of a source of the sound within the beam of the array. Thus, the pass band of the output filter is less than the separation in frequency between the reference signals for the respective receiving channels.

The operation of the invention may be further understood by examining the coherent properties of the desired signal and the uncorrelated characteristic of the noise. The desired signal is assumed to impinge upon the array along the direction of the maximum response axis of the array. The distance of the source of the desired signal from the array is sufficiently large that the sound waves of the desired signal may be regarded as substantially planar and in phase coherence along the entire array. The noise produced in the ocean emanates from many directions relative to the array. For example, a noise signal propagating along the face of the array impinges on one-half of the array before impingement on the second half of the array, the difference in the times of impingement upon the respective halves of the array being sufficient to decorrelate the noise signal received at the first half of the array with the noise signal received at the second half of the array. As a result, in any one channel the received noise is substantially uncorrelated between the two subchannels while the desired signal is highly correlated.

The resultant signals in the respective channels each have an undulating component due to the aforementioned uncorrelated noise incident upon the array of antenna elements. In view of the differing frequencies of the reference signals employed in the several mixing operations, the aforementioned undulations in each of the channels are out of synchronism and, therefore, tend to cancel each other upon the summation of the resultant signals of the respective channels.

However, the desired signal component of the resultant signal in each of the channels has a substantially constant value, free of undulations, due to the coherence of the desired signal across the entire array, this being in accordance with the substantially constant presence of the signal source within the beam of the array, and the substantially constant bearing of the signal source relative to the array access. Accordingly, the desired signal is unaffected by the summation of the resultant signals while the uncorrelated noise is significantly cancelled during the summation and the filtering operations. A significant improvement in the signal-to-the-noise power ratio has been observed in a signal processor employing the invention.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
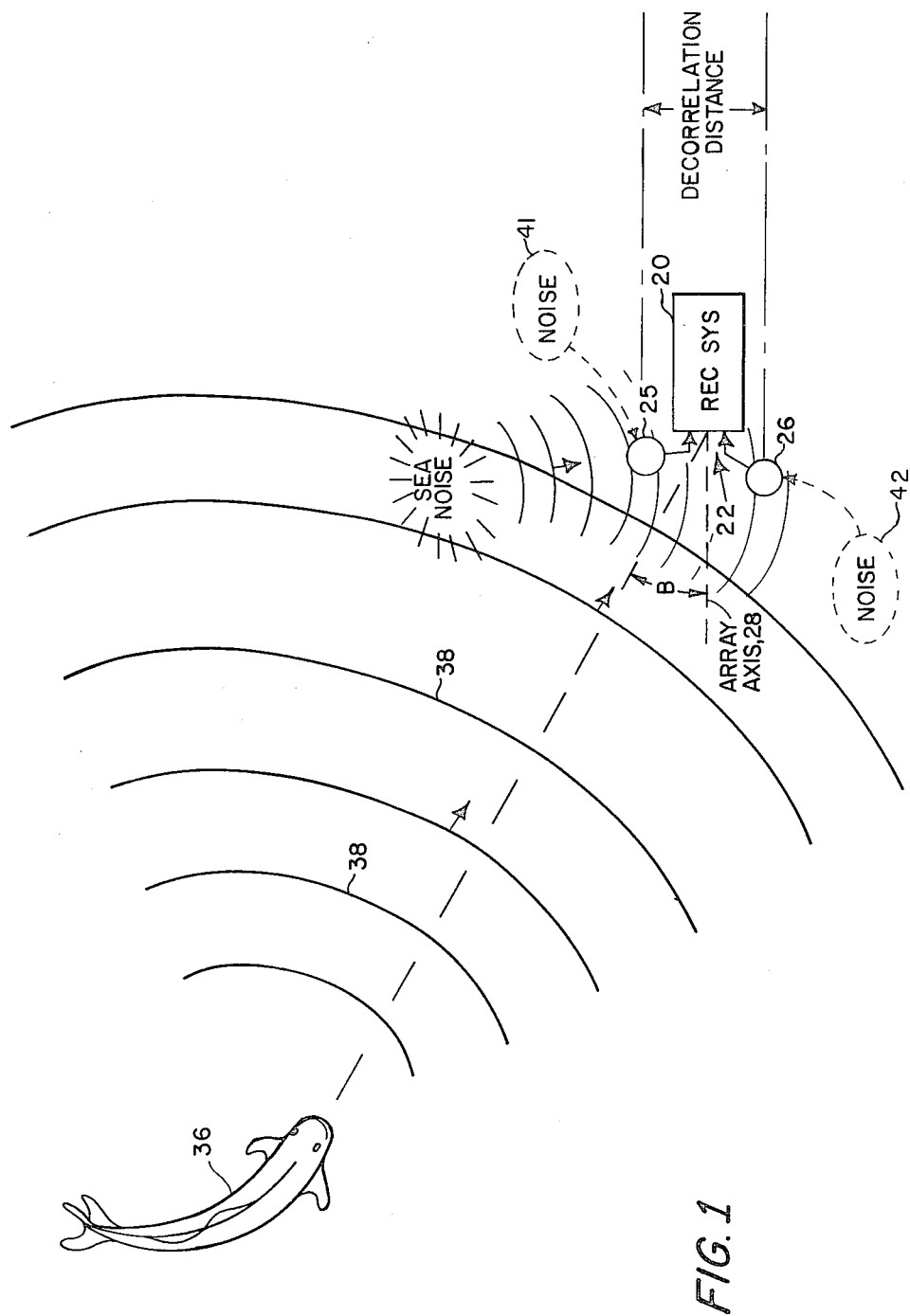
FIG. 1 is a stylized view of a sonar array receiving both radiations of signal and of noise.
Figure 2:
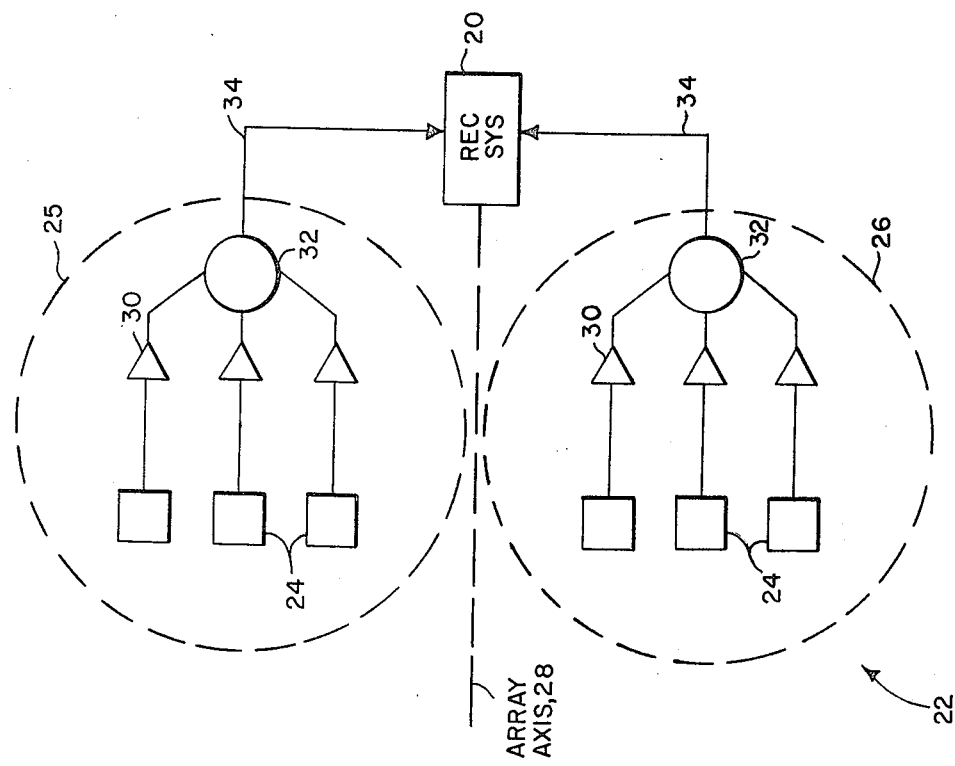
FIG. 2 is a block diagram of one embodiment of the array of FIG. 1.

Referring now to FIGS. 1 and 2, there is seen a receiving system 20 coupled to an array 22 of sonar transducers 24, the transducers 24 being arranged in subarrays 25-26 symmetrically positioned about an axis 28 of the array 22. Each of the subarrays 25-26 is understood to include preamplifiers 30 and a summing circuit 32 for combining the signals of the transducers 24 in the respective subarrays 25-26. The combined signals of each of the subarrays 25-26 are then coupled via lines 34 to the receiving system 20.

The system 20 is shown being utilized in an exemplary application of the processing of sonic signals produced by marine life in the ocean. The marine life is portrayed in FIG. 1 by a fish 36 and sound waves 38 which are shown propagating from the fish 36 to the array 22. Sea noise is also present. In view of the fact that the sea noise received at one of the subarrays 25-26 is uncorrelated with the sea noise received at the other of the subarrays 25-26 due to the spacing between the subarrays 25-26, the sea noise is portrayed schematically as being produced by two separate noise sources 41-42. The noise from the source 41 is shown impinging upon the subarray 25 to the right of the axis 28 while the noise from the source 42 is shown impinging upon the subarray 26 to the left of the axis 28. The sound waves 38 from the fish 36 are seen to be substantially planar in the vicinity of the array 22 and provide a sonic signal which is well correlated between the subarrays 25 and 26. Accordingly, an understanding of the invention is facilitated by regarding the system 20 as receiving three signals, namely, the desired signal from the fish 36 which impinges coherently on both subarrays 25-26, the noise signal from the source 41 impinging upon the subarray 25, and the noise signal from the source 42 impinging on the subarray 26.

Figure 3:
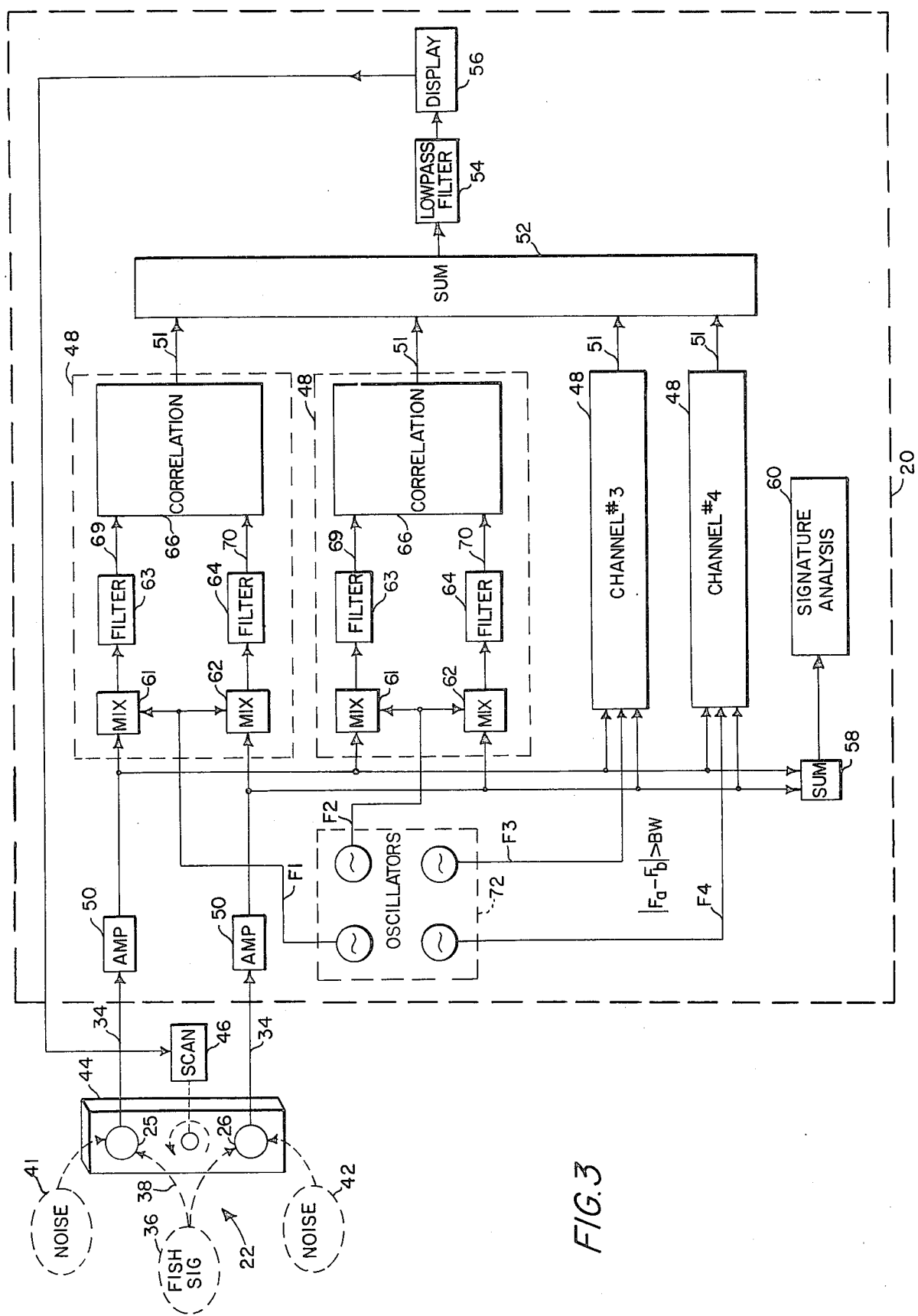
FIG. 3 is a block diagram of a receiving system of FIG. 1 showing multiple channels in accordance with the invention.

Referring now to FIG. 3, there is seen a block diagram of the receiving system 20, the diagram showing the coupling of the receiving system 20 to the array 22 as was seen previously in FIGS. 1 and 2. The array 22 is shown mounted on a frame 44 whereby it may be rotated by a scanner 46, shown mechanically coupled to the frame 44 by a dashed line, whereby the radiation pattern of the array 22 may be scanned in azimuth for measuring the bearing of the fish 36. Also seen schematically in FIG. 3 are the signals impinging on the subarrays 25-26 from the noise sources 41-42, and the signal from the fish 36.

In accordance with the invention, the receiving system 20 comprises a set of channels 48, four such channels being shown by way of example, for processing signals from the array 22. Amplifiers 50 amplify signals coupled via the lines 34 from the array 22 to each of the channels 48. Each amplifier 50 has a pass band sufficiently wide to pass the major portion of the signal spectrum, the pass band excluding the spectral components of the noise lying outside of the pass band. Output signals of the channels 48 are coupled via lines 51 to a summer 52 which sums together the output signals to produce a sum signal. The sum signal is filtered by a low pass filter 54 and then presented on a display 56. The bandwidth of the filter 54 is equal to the bandwidth of the data which is to be extracted from the sound wave 38.

By way of example, in the situation wherein the receiver 20 is being utilized to provide a bearing deviation indication, the bearing deviation being the angle B between the array axis 28 and the fish 36 as shown in FIG. 1, the response time of the filter 54 may be set approximately equal to the anticipated interval of time during which the fish 36 is expected to dwell within the main lobe of the radiation pattern of the array 22. Also, the display 56 may incorporate a well-known angle tracking circuit (not shown) responsive to the bearing indication signal from the filter 54 for activating the scanner 46 to rotate the frame 44 for maintaining the fish 36 within the main lobe of the radiation pattern of the array 22. Thus, the bandwidth of the filter 54 would be much smaller than the bandwidth of the amplifiers 50 which, by way of example, are shown being coupled via a summer 58 to a signature analyzer 60. The analyzer 60 identifies the presence of the fish 36, and distinguishes the sound of the fish 36 from some other sound which may be present in the ocean. Typically, the analysis of a signature utilizes both high and low frequency components of the sonic signal necessitating a relatively wide bandwidth to the amplifiers 50, while the relatively slow movement of the fish 36 within the radiation pattern of the array 22 permits a much smaller bandwidth to be utilized in the filter 54. The signal produced by the filter 54 would appear to have a substantially constant value as compared to the signal of the summer 58 which is utilized for the signature analysis. As will appear subsequently, it is the relatively constant amplitude of the bearing deviation signal from the filter 54 which permits the attainment of the larger ratio of signal power to noise power by this invention than has heretofore been possible.

Each of the channels 48 comprises a pair of mixers 61–62, and a pair of low pass filters 63–64 coupled to a correlator unit 66 via lines 69–70, respectively. The system 20 also comprises a source 72 of reference signals, the source 72 including four separate oscillators for producing reference signals at frequencies F1, F2, F3 and F4 for the mixers 61–62 in respective ones of the channels 48. Thus, the reference frequency F1 is applied to the first of the channels 48, with the reference frequencies F2, F3 and F4 being applied respectively to the second, the third and the fourth of the channels 48. Each of the frequencies F1, F2, F3 and F4 lie outside the pass band of the amplifier 50. The separation BW between any two of the frequencies F1, F2, F3 and F4 is shown in a mathematical formulation in FIG. 3 as the absolute value of $F_a - F_b$ wherein $F_a$ and $F_b$ are any pair of frequencies of the reference signals. The formulation shows that the frequency difference is greater than the bandwidth (BW) of the filter 54.

In each of the channels 48, the mixer 61 and the filter 63 comprise a subchannel for processing signals obtained from the right subarray 25, while the mixer 62 and the filter 64 comprise a second subchannel for processing signals obtained from the left subarray 26. The input signals on each of the lines 34, after being amplified by the amplifiers 50 are then mixed with a reference signal of the source 72 in the mixers 61–62 to produce signals at intermediate frequencies which are extracted by the filters 63–64. In each of the filters 63, 64, the intermediate frequency utilized in the preferred embodiment of the invention has been equal to the difference between the frequencies of the reference and the input signals. For example, tests conducted with the preferred embodiment of the invention utilized a passband of 1600 Hz–2800 Hz in the amplifiers 50. Reference signal frequencies of 1591, 1592, 2808 and 2809 Hz were utilized. A cut-off frequency of approximately 1.3 KHz for each of the lowpass filters 63–64 provides a sufficient pass band for the signals at the intermediate frequencies. A pass band of 0.1 Hz, corresponding to a beam dwell time of 10 seconds, was utilized for the low pass filter 54.

Reviewing the operation of the receiving system 20 in its use as a bearing deviation indicator for an acoustic signal impinging on the array 22, it is noted that bearing deviation indicators typically comprise a pair of circuits which are coupled respectively to the right and left sections of a sonar array. Such an arrangement is provided within any one of the channels 48 wherein the subchannels are coupled to the right and left sections of the array 22. The amplifiers 50, the mixers 61–62, and the filters 63–64 are sufficiently well matched to transmit the signals of the subarrays 25–26 to the comparison unit 66 without the introduction of any relative phase shift or time delay between the signals of the two subarrays 25–26. Thereby, any relative phase shift between signals of the two subarrays 25–26, as would result from an oblique incidence of the sound wave 38, is retained. The phase difference, or time delay, between the signals of the two subchannels is compared in the correlator unit 66 to provide a signal on line 51 which is representative of the bearing angle of the sound waves 38 relative to the array 22. The operation of the receiving system 20 is similar in its use as a detector of the signal of the fish 36. For the detection, the correlator unit 66, as will be described hereinafter, combines the signals of the two subchannels in cophasal relationship to provide an output signal which is greater than a predetermined threshold. The threshold is set at a predetermined value in well known circuitry (not shown) conveniently located within the display 56. Both, in the case of the bearing deviation indication and in the case of the detection, the signal provided by the filter 54 to the display 56 is of relatively constant amplitude as compared to the signal presented by the summer 58 to the analyzer 60.

Figure 4:
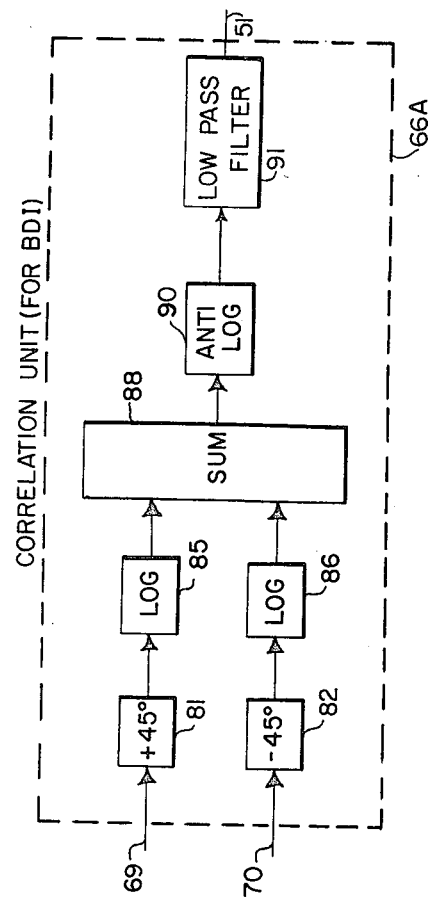
FIG. 4 is a block diagram of a correlator or comparison unit of FIG. 3, employing multiplication by means of logarithmic units.

Referring also to FIG. 4, there is shown an exemplary circuit to be included in the correlator unit 66 of FIG. 3 for providing the aforementioned function of a bearing deviation indicator, the correlator unit of FIG. 4 being identified by the legend 66A. The correlator unit 66A comprises phase shifters 81–82, logarithmic units 85–86, a summer 88, an antilogarithmic unit 90 and a low pass filter 91. The phase shifter 81 introduces a 45° phase lead to the signal on line 69 while the phase shifter 82 introduces a 45° lag to the signal on line 70, thereby producing a 90° phase shift between the signals on the lines 69–70. The units 85–86 produce voltages having amplitudes proportional to the logarithms of the amplitudes of the signals on the lines 69–70. The voltages are then summed by the summer 88 to produce a sum signal proportional to the logarithm of the product of the signals on the lines 69–70. The unit 90 then operates on the sum signal of the summer 88 with the inverse logarithmic function to provide a signal on line 51 having an amplitude proportional to the product of the signals on the lines 69–70. The low pass filter 91 has a passband of typically 10 Hz, as compared to the 0.1 Hz passband of the filter 54 of FIG. 3, and serves to attenuate any high frequency components which may be produced by the logarithmic circuits. The circuit of FIG. 4 is exemplary. For positive and negative factors, a four-quadrant multiplier is utilized. The multiplication function provided by the units 85–86, the summer 88 and the unit 90 is well known, such a circuit being available commercially for multiplication of positive and negative signal amplitudes such as, for example, a Raytheon multiplier circuit bearing the part number RC4200NB.

With respect to the operation of the circuit of FIG. 4, it is noted that when the fish 36 of FIG. 1 is located on the array axis 28, the signals on the lines 69 and 70 are in phase. The quadrature phase relationship introduced by the phase shifters 81–82 results in a product having essentially zero mean value appearing on line 51. As the fish 36 moves to the right or to the left of the axis 28, the amplitude of the product on line 51 becomes increasingly positive or increasingly negative in value. Thereby, the amplitude of the signal on line 51 serves as an indication of the angular orientation, or bearing, of the fish 36 relative to the array 22.

Various forms of multipliers are commonly in use in bearing deviation indicators. For example, one common form of multiplier which is frequently used as a phase detector is constructed in the form of a bridge circuit wherein a set of transformers are intercoupled by a set of diodes. In that arrangement, one transformer is driven by one of the input signals, such as the signal on line 69, while a second of the transformers is driven by the second input signal such as the signal on line 70. A third transformer provides the output signal. Such a circuit is not shown in the figures since it is well known and, also, it has been determined experimentally that the circuit of FIG. 4 provides a higher signal-to-noise power ratio. In particular, it is noted that with the bridge multipliers, the signal applied to one of the input transformers serves as a gate signal for operating the diodes of the bridge circuit. In contradistinction, the linearity of the signals of the multiplying factors (the signals on the lines 69-70) in FIG. 4 is preserved during the multiplying process so that the output product on line 51 is proportional both to the amplitude of the signal on line 69 and to the amplitude of the signal on line 70.

Figure 5:
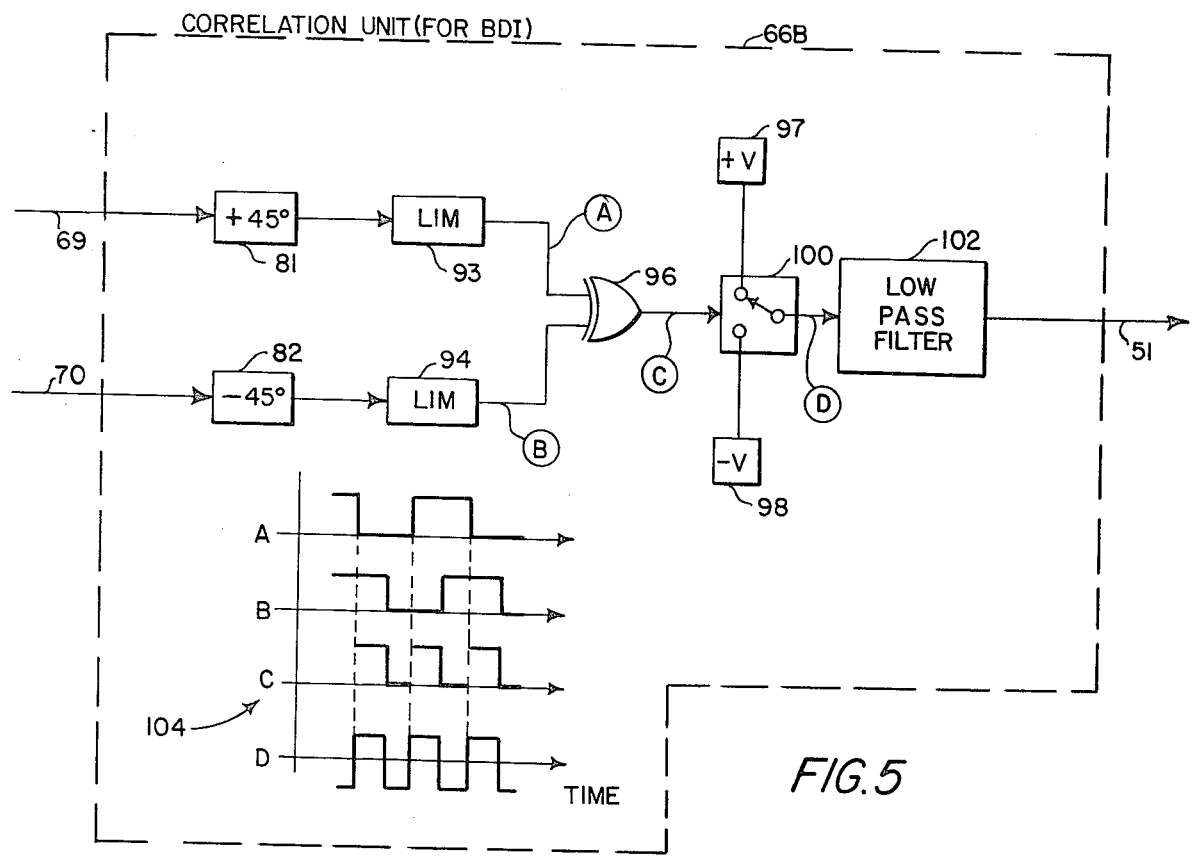
FIG. 5 is a block diagram of an alternative embodiment of the correlator unit of FIG. 3 showing an exclusive OR circuit which functions in the manner of a multiplier to produce a bearing deviation indication (BDI)

Referring also to FIG. 5, it is seen that the correlator unit 66 of FIG. 3 may comprise digital circuitry providing an exclusive-OR function to produce a signal representative of the bearing of the sound waves 38 of FIG. 1 relative to the array 22. The comparison unit of FIG. 5 employing the digital circuitry is identified by the legend 66B and is seen to comprise a pair of limiters 93-94, an exclusive-OR gate 96, voltage sources 97-98 providing positive and negative voltages of equal amplitude V, a switch 100, a low pass filter 102, and the phase shifters 81-82 previously seen in FIG. 4. The limiters 93-94 convert the signals on the lines 69 and 70 to signals having substantially a square waveform. The signals of the limiters 93-94 are then applied to the input terminals of the exclusive-OR gate 96. In response to the signals of the limiters 93-94, the exclusive OR gate 96 applies a signal having a logic state of 1 to the switch 100 during intervals of time when the waveforms provided by the limiters 93-94 are of opposite sense.

When the waveforms provided by the limiters 93-94 have the same sense, the gate 96 applies a signal having a logic state of 0 to the switch 100. In response to the logic 1 signal, the switch 100 couples the voltage $+V$, from the source 97 via the filter 102 to the line 51. In response to the logic 0 signal, the switch 100 couples the voltage $-V$ from the source 98 via the filter 102 to the line 51. The cut-off frequency of the low pass filter 102 is much lower than the frequencies of the signals on the lines 69 and 70 with the result that the filter 102 acts as an integrator to provide a voltage having a magnitude equal to the average difference in phase, or time delay, between the output signals of the limiters 93-94. For example, a cut-off frequency of 10 Hz may be utilized to provide a pass band equal to that of the filter 91 of FIG. 4.

The phase shifters 81-82 impart a relative phase shift of 90° between the signals on the lines 69-70 as was described previously with reference to FIG. 4. Since the phase shifted signals of the phase shifters 81-82 are coupled to the limiters 93-94, the waveforms of the output signals of the limiters 93-94 are similarly shifted as may be seen in a set of graphs 104 labeled A-D corresponding to identically labeled lines of the figure. The square waveform of the signal of the limiter 94, shown as the second of the graphs 104, is seen to be delayed by 90°, or a time interval of one-quarter the period of the waveform, relative to the square waveform of the signal of the limiter 93, shown as the first of the graphs 104. The graphs 104 depict the situation wherein a wave 38 of FIG. 1 is propagating in a direction parallel to the axis 28 of the array 22. In the event that the direction of propagation of the wave 38 is inclined relative to the axis 28, then the waveform of the limiter 94 would lag the waveform of the limiter 93 by more than 90°, or less than 90°, depending on the sense of the angle of incidence of the waves 38 upon the array 22.

The third of the graphs 104 shows the output signal of the exclusive-OR gate 100, the signal being seen to be a succession of alternating states of logic 1 and logic 0. The duration of a logic 1 is equal to the duration of a logic 0 for the aforementioned 90° relationship between the signals of the limiters 93-94. The fourth of the graphs 104 shows the waveform of the signal at the output terminal of the switch 100, the switch 100 in conjunction with the sources 97-98 being seen to shift the mean value for the signal of the fourth graph. In particular, it is noted that the mean value of the fourth graph is zero only when the signals on the lines 69-70 are in phase, the mean value becoming positive or negative when the signal on the line 70 respectively lags or leads the signal on line 69. The low pass filter 102, because of its integration operation, recovers the mean value of the signal of the fourth graph to provide the aforementioned voltage on line 51 which assumes increasingly positive values for increasing phase lags of the signal on line 70 relative to the signal on line 69, the voltage on line 51 becoming negative when the signal on line 70 leads a signal on line 78. Thus, the relationship of the amplitude of the voltage on line 51 as a function of the relative phase of the signals on the lines 69-70 is the same as that previously described with reference to FIG. 4.

Figure 6:
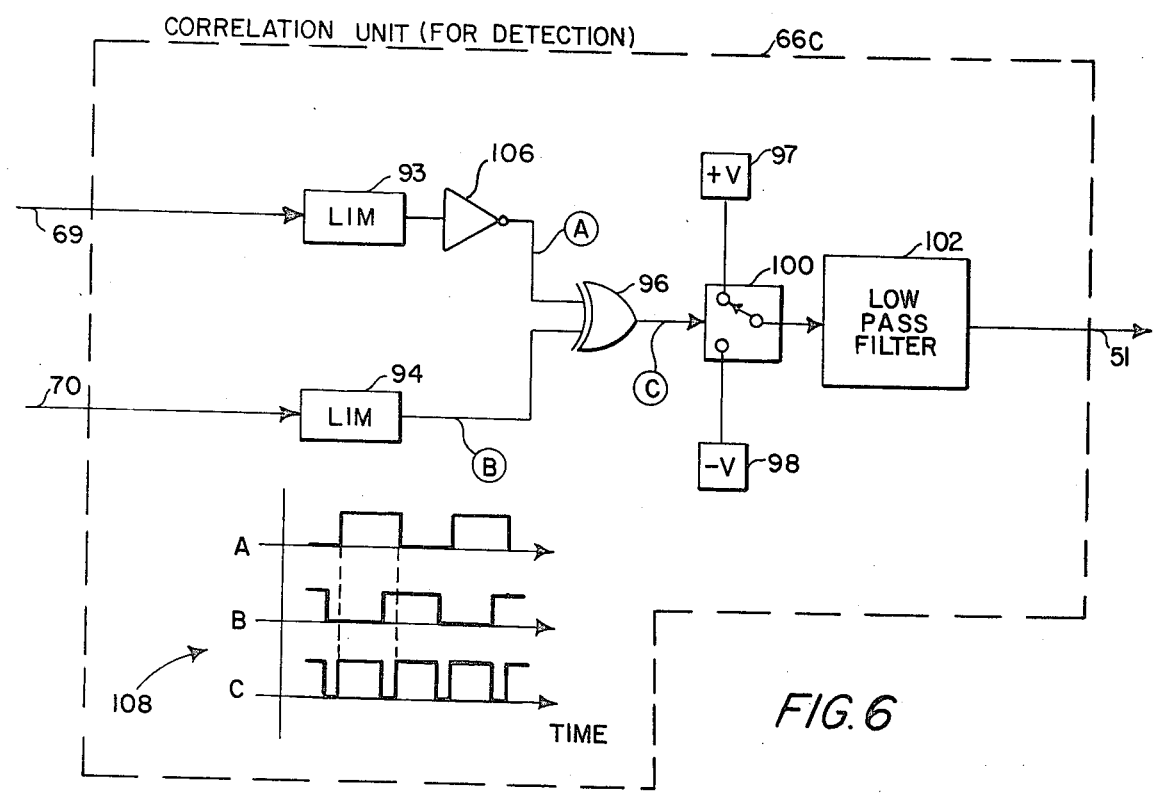
FIG. 6 is a block diagram of an alternative embodiment of the correlator unit of FIG. 3 employing an exclusive OR circuit, such as that of FIG. 5, for detection of a sonar signal.

Referring now to FIG. 6, there is seen a further circuit which may be incorporated into the correlator unit 66 of FIG. 3, a comparison unit incorporating the circuit of FIG. 6 being identified by the legend 66C. The correlator unit 66C is used for the detection of a source of sound, such as the fish 36, and is therefore responsive to the presence of cophasal signals from the subarrays 25-26 in contradistinction to the quadrature relationship described for the bearing indication of FIGS. 4 and 5. The comparison unit 66C is seen to comprise the same elements as the correlator unit 66B, except that the phase shifters 81-82 are absent, and an inverter 106 introduces a phase shift of 180° between the signals of the limiters 93-94. A set of graphs 108 shows the waveforms, identified by the legends A-C, appearing at the output terminals respectively of the inverter 106, the limiter 94 and the gate 96 for the case wherein the waves 38 of FIG. 1 propagate in a direction angled slightly to the array axis 28. Thus, it is seen that the gate 96 provides a sequence of signals alternating between a logic 1 and a logic 0 with the duration of the logic 1 being equal to the duration of the logic 0 when the incident waves 38 propagate parallel to the axis 28. When the waves 28 propagate in a direction inclined to the axis 28, the signal on the line 69 would be shifted in phase relative to the signal on the line 70. As a result, the waveforms portrayed in the first and second of the graphs 108 would be displaced in time relative to each other and, in the third of the graphs 108, the duration of the logic 1 pulses would be reduced. The filter 102, performing the integration function as described with reference to FIG. 5, provides the mean value of the signal of the gate 96, the mean value appearing on the line 51. The signal on line 51 has a maximum value for broadside incidence of the sound waves 38 upon the array 22, the amplitude of the signal on line 51 decreasing for wavefronts propagating in a direction inclined to the array axis 28. Thereby, the correlator unit 66C produces a maximum signal for detecting a source of sound when the axis 28 of the array 22 is pointed in the direction of that source.

In both the embodiments of FIGS. 5 and 6, it should be noted that the use of the exclusive-OR gate 96, in combination with the level translation provided by the switch 100 and the sources 97-98, provides a zero mean value on line 51 for uncorrelated noises of zero mean value each on the lines 69-70. A logic circuit employing an AND gate or OR gate (not shown) would not provide the foregoing functional relationship to the noise amplitudes on lines 69-70 and would result in a non-zero mean value of the noise amplitude on line 51. Since, as was explained hereinabove, the inventive concept assumes that the noise impinging on the subarray 25 of FIG. 1 is uncorrelated with the noise impinging on the subarray 26, the circuitry utilized in the correlator unit 66 of FIG. 3 should be responsive to the lack of correlation between the two subchannels as is the exclusive-OR circuit and, thereby, provide the foregoing zero mean value of the noise in order to insure the beneficial reduction of noise power provided by the invention.

Figure 7:
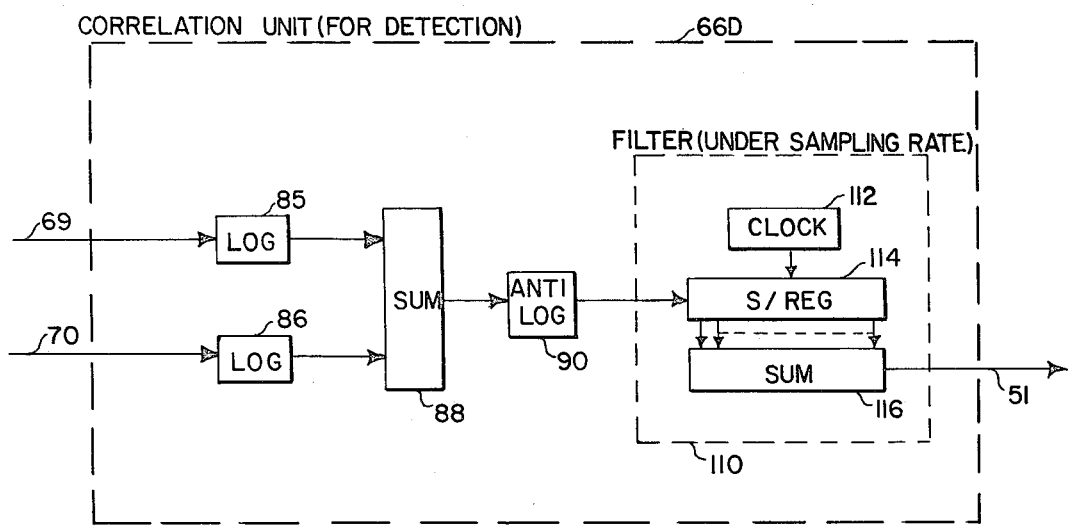
FIG. 7 is a block diagram of an alternative embodiment of the correlator unit of FIG. 3 showing multiplication by logarithms followed by filtering at an undersampling rate for detection of a sonar signal.

Referring now to FIG. 7, there is shown yet another embodiment of the correlator unit 66 of FIG. 3, the correlator unit of FIG. 7 being identified by the legend 66D. The correlator unit 66D comprises the logarithmic units 85-86, the summer 88 and the antilogarithmic unit 90 previously described in FIG. 4. The correlator unit 66D is used for the detection of a source of sound in a manner analogous to that taught for the detection of a source of sound by the correlator, unit 66C of FIG. 6. The correlator unit 66D of FIG. 7 further comprises a filter 110 comprising a clock 112, a shift register 114, and a summer 116. The register 114 may be fabricated of charge coupled devices and is strobed by clock pulses from the clock 112 at a rate much lower than the Nyquist rate for signals coupled via the amplifiers 50 of FIG. 3. As was noted hereinabove with reference to FIG. 3, the pass band of the filter 54 is significantly less than that of the amplifiers 50 since the data rate for detection of signals provided by the filter 54 is commensurate with the reciprocal of the dwell time of the fish 36 within the main lobe of the radiation pattern of the array 22. Accordingly, the strobing of the register 114 is set in accordance with the foregoing data rate; in practice, the strobing is set at a rate somewhat higher than the Nyquist rate for the detection data, for example, three times the anticipated data rate for the detection of the sound source.

In operation, the signals on the lines 69-70 are multiplied together by the correlator unit 66D with the product of the multiplication appearing at the output terminal of the antilogarithmic unit 90. With each strobing of the register 114, a sample of the product is entered into a stage of the register 114. Upon successive strobing of the register 114, additional samples of the product are entered into the register 114 as the previous samples advance through the successive stages of the register 114. The signals from the output terminals of the successive stages of the register 114 are summed together by the summer 116 to provide a filtered product on the line 51. The filter 110 functions in the manner of a transversal filter for data at the relatively low data rate of the detection data, however, the filter 110 is regarded as sampling at an undersampling rate for data having a relatively large bandwidth as is required by the signature analyzer 60 of FIG. 3. If desired, a multiple bit digital shift register and adder (not shown) may be utilized in the filter 110 in lieu of the charge coupled device and summer in which case an analog-to-digital converter would precede the register and a digital-to-analog converter would follow the adder. The strobing rate by the clock 112 would be the same in both the cases of the digital shift register and the charge coupled device.

Figure 8:
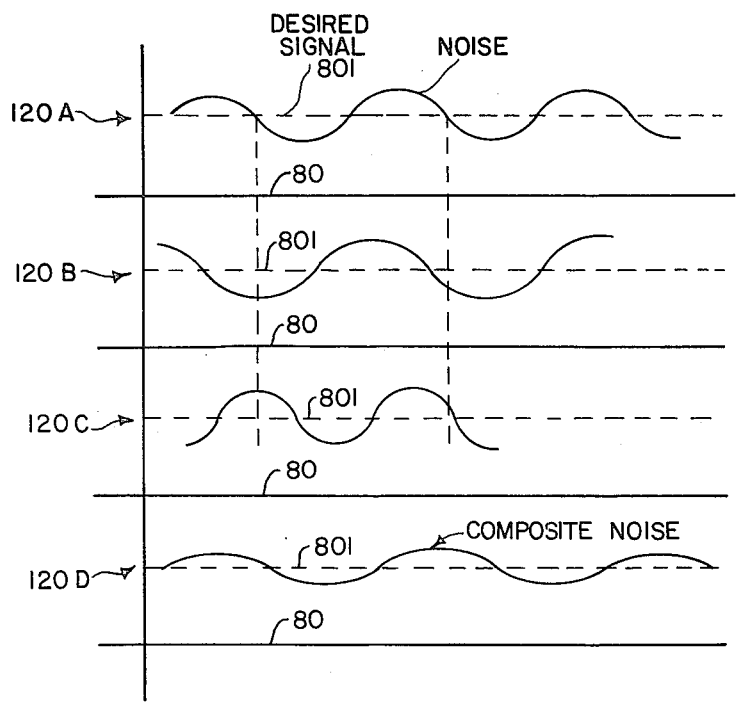
FIG. 8 shows a set of graphs depicting the undulating signal of the noise and the relatively steady value of the desired signal for each of the three channels of the receiving system of FIG. 3, a fourth graph of FIG. 8 showing the resultant summation of the signals of the preceding three graphs.

Referring also to FIG. 8, the operation of the invention is further explained with reference to a set of graphs 120 wherein individual ones of the graphs are further identified by the legends A-D when it is desired to refer to a specific one of the graphs 120. The graph 120A represents waveforms seen on line 51 from one of the channels 48 of FIG. 3, the graph 120B represents waveforms seen on line 51 from a second of the channels 48 and the graph 120C represents waveforms seen on line 51 from a third of the channels 48. The graph 120D shows waveforms of signals appearing at the output terminal of the filter 54 of FIG. 3. The waveforms of the graphs 120 are exemplary. In each of the graphs 120, the solid trace represents the random component of the noise of the sources 41-42 while the dashed trace represents the desired signal from the fish 36 as viewed through the relatively narrow bandwidth of the filter 54. The graphs 120 are equally applicable to each of the embodiments of the correlator unit 66 as portrayed in the FIGS. 4-7.

The desired signals in each of the graphs 120A-C are seen to have the same form, namely a straight line 801 representing a DC output voltage level with respect to the zero output voltage level 80, because the signal of the fish 36 impinges on each of the subarrays 25-26 coherently. The noise waveform differs in each of the graphs 120A-C for the following reasons. First, it is noted that since the noise of the source 41 impinging on the right side of the array 22 lacks coherence with the noise from the source 42 impinging on the left side of the array 22, the output signal on line 51 of a channel 48 has undulations due to the noise. Secondly, it is noted that narrow band noise has a quasi sinusoidal form wherein the undulations occur at substantially the center frequency of the pass band in which the noise is being observed. In each of the channels 48, the center frequency of the signal spectrum in the filter 63 has a value dependent on the frequency of the respective reference signal and, in addition, the spectrum is inverted for those channels wherein the reference frequency is above the pass band of the amplifier 50. For the exemplary reference frequencies of 1591 and 1592 Hz, the center frequencies of the signal spectra are displaced by one hertz. Thus, the undulations of the noise components of the signals on the lines 51 of the respective ones of the channels 48 differ in their respective frequencies. Accordingly, the noise component is portrayed differently in each of the graphs 120A-C to show a slight difference in frequency and instantaneous amplitude.

With reference to the graph 120D drawn to a scale approximatey one-third that of graphs 120A-C, it is seen that the constant values of the desired signal in each of the graphs 120A-C are summed together by the summer 52 to provide a composite signal which is also of constant amplitude. However, the undulations of the composite noise signal are seen to be reduced from the undulations of the noise portrayed in the graphs 120A-C because of the summation of non-coherent waveforms. Thereby, the system of FIG. 3 results in a reduction of noise power relative to signal power. The reduction of the nose power is further enhanced by the use of still more of the channels 48 than the four channels 48 shown in FIG. 3.

By way of summary, it is seen that the advantage of an increased ratio of signal power to noise power is obtained by the invention in those situations wherein a receiver bandwidth is closely matched to an incoming sonar signal, but wherein the impulse response time of the receiver is much less than time available for making a measurement. The receiver is exemplified by the amplifier 50 or filter 63 of FIG. 3. The measurement is exemplified by the bearing measurement wherein the fish 36 remains in the receiving beam pattern for a period of time which is much longer than the impulse response time of the receiver. Since the output filter bandwidth, the filter 54 of FIG. 3, is commensurate with the reciprocal of the dwell time of the fish 36 within the beam, it is seen that the invention is advantageously utilized in those situations wherein the receiver bandwidth multiplied by the dwell (or available observation time) is much greater than unity.

The advantage arises from the relative displacement between spectra of the channels 48 and in the inversion of the spectra of some of the channels 48, which result in a decorrelation of the noise component of the signal in one channel 48 relative to that of another channel 48. The foregoing relationship may also be expressed by the cross product of the signals at the output terminals, the lines 51 of FIG. 3, wherein the integral of the cross products over an integration time, such as the response time of the output filter 54, tends toward zero, as does the integral of orthogonal functions, over increasingly long integration times. The foregoing mathematical relationship can also be satisfied by using pairs of reference signals, sinusoids and cosinusoids, of the same frequency. Also, it would appear that the foregoing relationship of the cross products would be satisfied by coupling exemplary noise modulators (not shown) to the oscillators of the source 72 for frequency modulation of the reference signals. Similarly, it is believed that a nonsinusoidal signal such as a square wave signal may be utilized as a reference signal. In each of the foregoing examples, the noise component of the signal in one channel 48 differs from, or is out of synchronism with, the noise component in another one of the channels 48.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A data processing system comprising:
a plurality of pairs of signal processing channels each channel of a pair being response to a different one of two input signals, each of said channels having mixing means for translating said input signal to an intermediate frequency, each of said channels producing output signals having the same waveform in the absence of noise;
means for generating a set of reference signals of different frequencies, individual ones of said reference signals being coupled to said mixing means in respective pairs of said channels to provide mixer output frequency signals having a frequency less than said input signals, the frequencies of respective ones of said reference signals being separated by an amount of frequency which is larger than the bandwidth of said input signals;
means for multiplying the output signal of the mixer of one channel of a pair with the output signal of the mixer in the other channel of said pair to provide a channel pair output signal; and
means for combining the channel pair output signals produced by the multiplying means of each pair of said signal processing channels to produce a combined signal wherein undulations induced by noise in the input signals each of said channels combine incoherently for a reduction in noise power while a component of said combined signal obtained from said input signals is coherently combined for increasing the ratio of signal power relative to noise power.

2. A system according to claim 2 wherein said multiplying means comprises an exclusive-OR circuit.

3. A system according to claim 2 wherein said multiplying means comprises a multiplier circuit preserving the linearity of the signals serving as factors in a multiplication operation of said multiplying circuit.

4. A system according to claim 3 further comprising a filter coupled to each said multiplying means for processing a product of said multiplying means, said filter being clocked at an undersampling rate.

5. A signal processor for obtaining data of a source of radiant energy impinging upon an array antenna comprising:
a pair of input terminals for coupling to different portions of an array antenna;
a plurality of signal processing channels each of which includes a pair of subchannels, each subchannel of a pair being coupled to respective ones of said input terminals, each of said subchannels having filtering means for delineating a pass band of signals incident upon said antenna;
a source of reference signals differing in frequency by an amount of frequency greater than the width of said pass band, individual ones of said reference signals being coupled to the pair of subchannels in respective ones of said channels;
each of said subchannels of a pair including means for mixing a different one of said reference signals with signals obtained from said input terminals;
each of said channels including means for correlating an output signal of one frequency from said mixing means in one of said subchannels with an output signal of the same one frequency from said mixing means in the other of said subchannels to provide a channel data signal; wherein said
correlating means includes means for multiplying said signal in said one subchannel by said signal in said other subchannel, said multiplying means preserving the linearity of said signal in said first subchannel and said signal in said second subchannel; and
means for summing together the data signals of respective ones of said channels.

6. A processor according to claim 5 wherein said summing means includes a filter having a pass band smaller than the bandwidth of said subchannels.

7. A processor according to claim 5 comprising in addition an array antenna;
said input terminals being coupled to different portions of said array antenna.

* * * * *